(12) United States Patent
Kim et al.

(10) Patent No.: US 10,549,389 B2
(45) Date of Patent: Feb. 4, 2020

(54) PROCESSING UNIT FOR A STATOR BAR OF A GENERATOR AND WELDING METHOD USING THE SAME

(71) Applicant: DOOSAN HEAVY INDUSTRIES CONSTRUCTION CO., LTD., Gyeongsangnam-do (KR)

(72) Inventors: Dae Op Kim, Gyeongsangnam-do (KR); Boung Won Kim, Gyeongsangnam-do (KR); Ki Cheol Son, Gyeongsangnam-do (KR); Bong Gyu Park, Gyeongsangnam-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 451 days.

(21) Appl. No.: 15/408,127

(22) Filed: Jan. 17, 2017

(65) Prior Publication Data

US 2017/0341190 A1 Nov. 30, 2017

(30) Foreign Application Priority Data

May 26, 2016 (KR) .................. 10-2016-0065006

(51) Int. Cl.
*B23K 37/04* (2006.01)
*B23K 31/02* (2006.01)
*H02K 15/04* (2006.01)
*B23K 101/36* (2006.01)

(52) U.S. Cl.
CPC .......... *B23K 37/0452* (2013.01); *B23K 31/02* (2013.01); *H02K 15/0414* (2013.01); *B23K 2101/36* (2018.08)

(58) Field of Classification Search
CPC ............... B23K 37/0452; B23K 31/02; B23K 2101/36; B23K 3/087; B23K 37/047; B23K 37/04–0538; H02K 15/0414; H02K 15/0081; H02K 15/00; H02K 15/02
USPC ............................... 228/47.1–49.5, 212–213
See application file for complete search history.

(56) References Cited

U.S. PATENT DOCUMENTS

| 4,897,904 | A | * | 2/1990 | Cowles | .................. | B23K 37/04 266/77 |
| 4,922,741 | A | * | 5/1990 | Bridges | .................. | H02K 15/04 140/92.1 |
| 4,926,541 | A | * | 5/1990 | Hakuta | .................. | H02K 15/00 29/598 |
| 5,123,161 | A | * | 6/1992 | Kubo | ..................... | B62D 65/02 219/79 |

(Continued)

FOREIGN PATENT DOCUMENTS

| EP | 1658922 A1 | 5/2006 |
| JP | 2007043899 A | 2/2007 |

OTHER PUBLICATIONS

Machine translation of JP-2007043899A1 (no date available).*

(Continued)

*Primary Examiner* — Kiley S Stoner
(74) *Attorney, Agent, or Firm* — Invenstone Patent, LLC

(57) ABSTRACT

A processing apparatus for a stator bar of a generator according to an embodiment of the present disclosure may allow a worker to safely and easily perform welding on both ends of a plurality of stator bars to be installed in the generator, thereby improving workability.

8 Claims, 14 Drawing Sheets

(56) References Cited

U.S. PATENT DOCUMENTS

| | | | | |
|---|---|---|---|---|
| 6,467,675 B1* | 10/2002 | Ozaku | ............... | B62D 65/00 |
| | | | | 228/175 |
| 6,622,906 B1* | 9/2003 | Kushibe | ............ | B23K 37/04 |
| | | | | 219/124.31 |
| 7,942,307 B2* | 5/2011 | Greenwall | ........ | B23K 9/0284 |
| | | | | 228/145 |
| 8,434,657 B2* | 5/2013 | Landoll | .......... | B23K 37/0235 |
| | | | | 228/32 |
| 9,162,325 B2* | 10/2015 | Furuta | ............ | B23K 37/0461 |
| 2010/0187738 A1* | 7/2010 | Tozaki | ............ | B23K 37/0443 |
| | | | | 269/71 |
| 2010/0242260 A1 | 9/2010 | Schumacher et al. | | |
| 2012/0228272 A1* | 9/2012 | Carlson | .......... | H02K 15/0012 |
| | | | | 219/75 |
| 2015/0328714 A1* | 11/2015 | Larsson | ............ | B23K 20/126 |
| | | | | 228/112.1 |
| 2019/0022808 A1* | 1/2019 | Tsui | ..................... | B23Q 1/25 |
| 2019/0247962 A1* | 8/2019 | Boyd | ................... | B23K 37/04 |
| 2019/0270157 A1* | 9/2019 | Kishikawa | .......... | B23K 9/127 |

OTHER PUBLICATIONS

An extended European search report issued by the European Patent Office dated Sep. 4, 2017 in connection with European patent application No. 17155330.8.

Japanese Office Action issued by the Japanese Patent Office dated Nov. 14, 2017 in connection with Japanese patent application No. 2017-005456.

\* cited by examiner

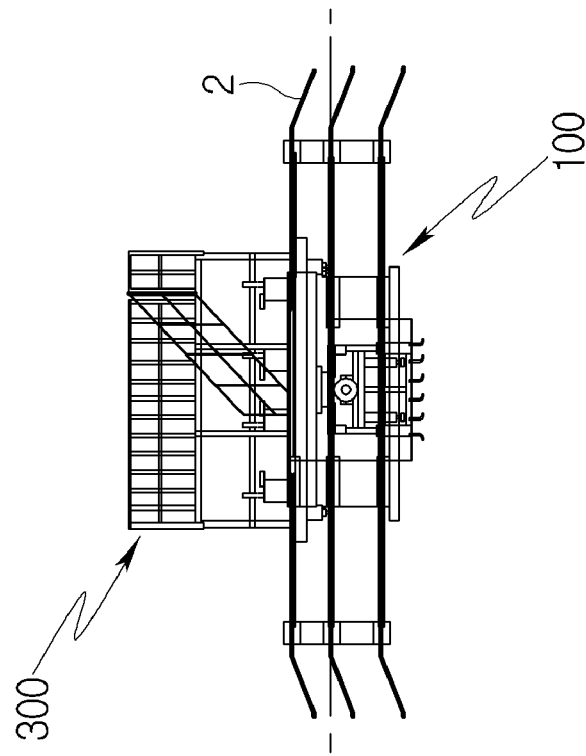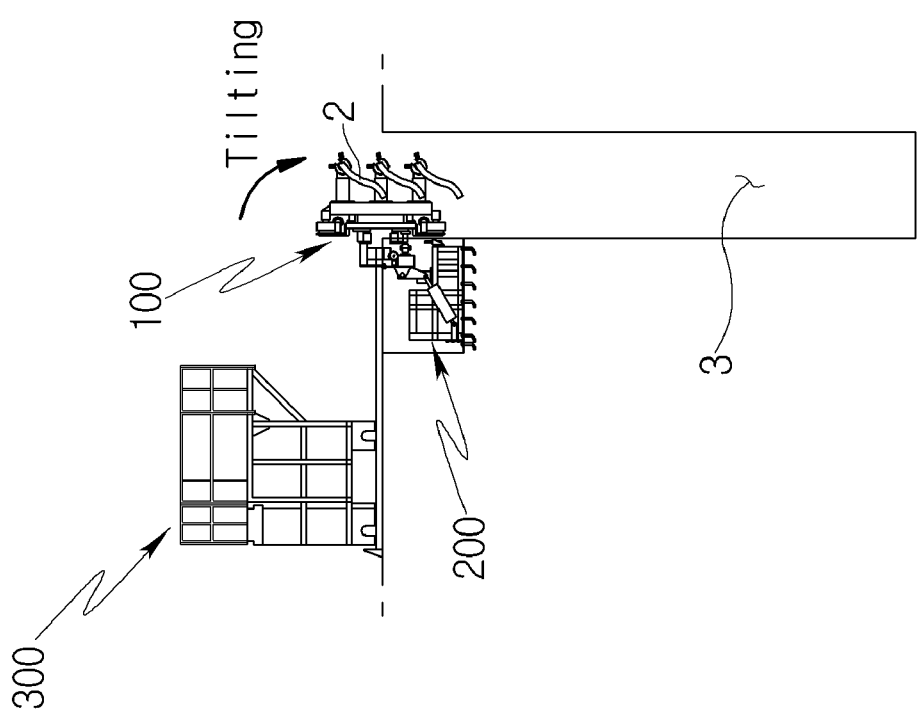

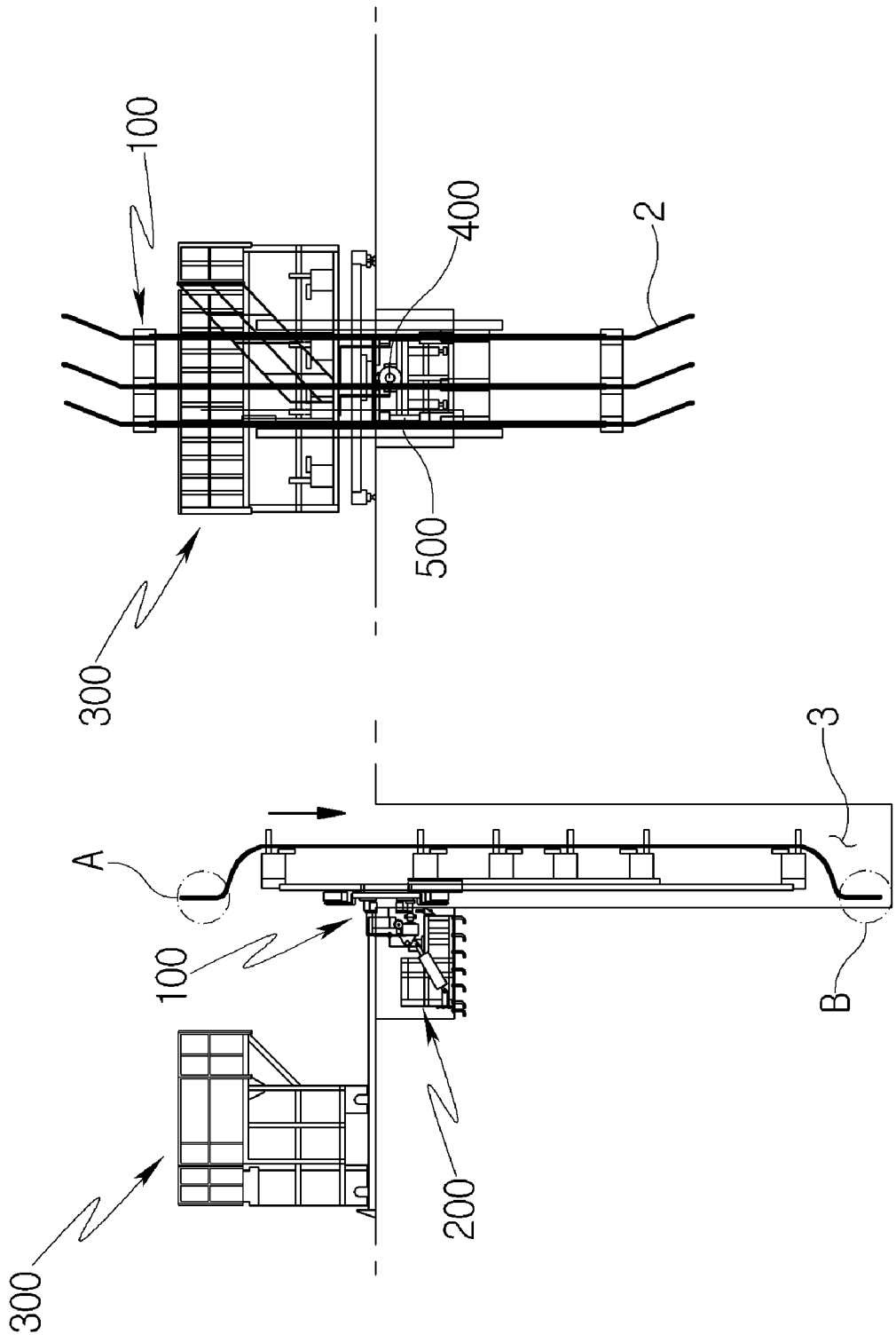

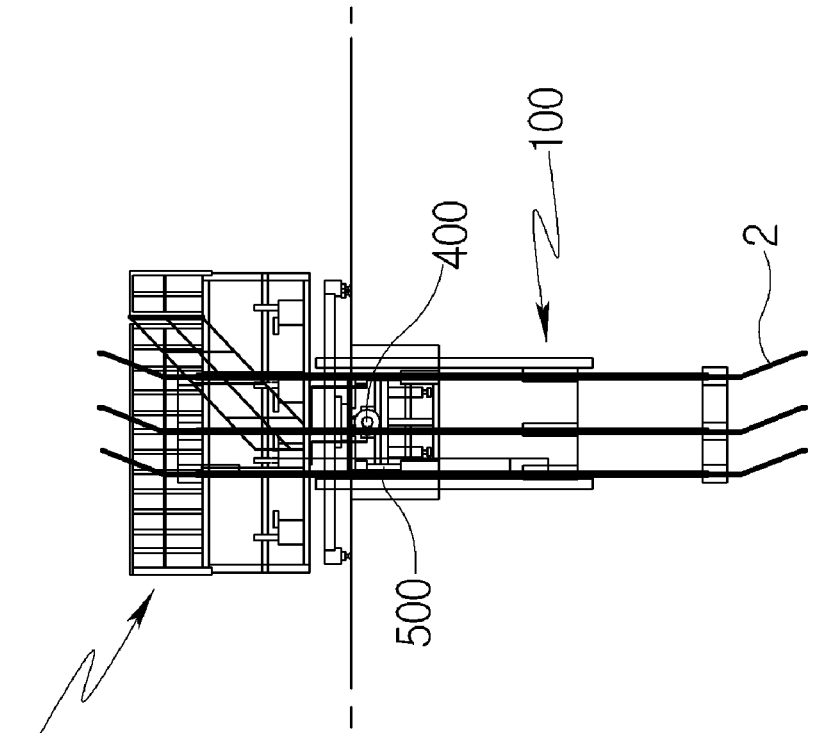
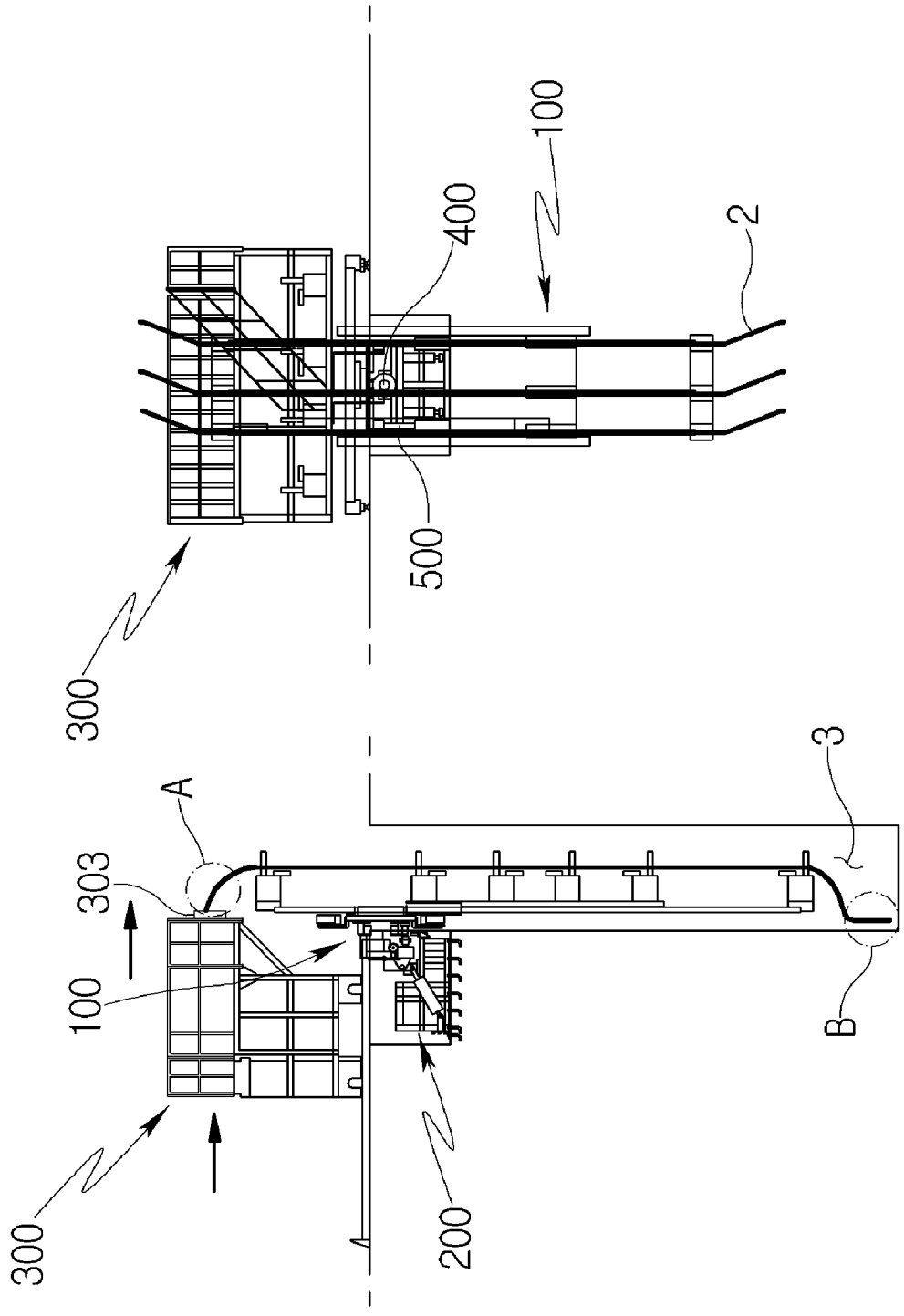

PROCESSING UNIT FOR A STATOR BAR OF A GENERATOR AND WELDING METHOD USING THE SAME

CROSS-REFERENCE TO RELATED APPLICATION(S)

This application claims priority to Korean Patent Application No. 10-2016-0065006, filed on May 26, 2016, the disclosure of which is incorporated herein by reference in its entirety.

BACKGROUND

Exemplary embodiments of the present disclosure relate to equipment for easily rotating and welding both of right and left ends of a stator bar of a generator on a setup table, and more particularly, to a processing unit of a stator bar for a generator and a welding method using the same that improve workability of a worker and efficiency in welding of the stator bar.

Generally, a generator means a device for converting mechanical energy into electrical energy. According to a basic principle of the generator, the generator generates electromotive force by using electromagnetic induction.

For example, when a coil is placed between two magnets and then rotates, a magnetic field in the coil is changed, and an induced electromotive force is generated at both ends of the coil, such that an induced current flows. The so-formed current is alternating current of which intensity and a direction are periodically changed.

The generator is widely used in various industrial fields, and as an example, the generator receives a rotation force from a steam turbine provided in a power plant. In the steam turbine engine, steam generated in a furnace is supplied to a high-pressure turbine to operate the high-pressure turbine, and the steam passing through the high-pressure turbine is supplied to a low-pressure turbine to operate the low-pressure turbine.

The steam turbine engine is disposed to transfer the rotation force in an axial direction, and transfers the rotation force to the generator that is adjacent and axially coupled to the low-pressure turbine.

The generator is rotatably disposed in the axial direction in a cylindrical casing, and includes a rotor serving as an electromagnet by magnetic flux generated by a rotor coil, a stator winding enclosing in the axial direction of the rotor, and retaining rings each installed at a front end portion and a rear end portion of the rotor. The rotor coil generates magnetic flux at an outer side of the axis direction of the rotor and serves as a pathway through which the current flows.

The generator includes a stator bar, and the stator bar is mounted on a separate brazing facility to perform brazing on a front end portion and a rear end portion thereof.

Separate transport equipment is used in welding the stator bar using the brazing facility and workability is reduced. As a result, a countermeasure therefore is desirable.

BRIEF SUMMARY

An object of the present disclosure is to provide a processing unit of a stator bar for a generator and a welding method using the same, capable of safely performing welding operation since a plurality of stator bars may be tilted and may rotate in a state in which the stator bars are swung.

In accordance with one aspect of the present disclosure, there is provided a processing unit of a stator bar for a generator, including: a setup table including a plurality of mounting parts fixing the stator bar to be installed in the generator to weld both ends of the stator bar; a tilting part tilting the setup table toward a pit at a specific angle by a base frame connected to a lower portion of the setup table and a first driving part positioned above the base frame; a workstation facing the setup table and including a second driving part for moving the workstation toward the setup table and a welding part positioned at a front surface of a worktable and performing welding on the stator bar; a rotating part provided between the setup table and the tilting part and rotating the setup table at a first angle in the pit; and a sliding part provided below the setup table to slide the setup table in a longitudinal direction of the pit.

A plurality of mounting parts may be disposed along a length direction of the stator bar.

The mounting part may include a seating part provided on an extension bar that is extended from an upper portion of the setup table when viewed from the front, and opened upwardly so that the stator bar is inserted, and first cylinder parts installed to face each other at the seating part and moving toward or away from the stator bar positioned in the seating part.

The seating part may include a tooth part formed on the extension bar in a semi-circular shape at a lower rear portion of the seating part to be rotated in a clockwise direction or in a counterclockwise direction in a state in which the stator bar is mounted; and a first motor part provided to supply a rotation force to the tooth part.

A plurality of first motor parts may simultaneously rotate at the same rotation angle.

The first driving part may include a second cylinder part having one end positioned on an upper surface of the base frame and the other end extending toward a lower surface of the setup table; a first arm connected to an upper end of the second cylinder part and rotating within a specific angle range through a hinge part; and a link member transferring a rotation force of the second cylinder part to the setup table.

The tilting part may maintain the setup table to be horizontal before tilting, and when the setup table is tilted toward the pit, the tilting part may tilt the setup table at an angle of 90 degrees.

The processing unit may further include a first stopper positioned at a side surface of the setup table to damp shock due to the tilting of the setup table; and a second stopper positioned at a side surface of the tilting part and maintained to be in contact with the first stopper when the setup table is tilted.

In accordance with another aspect of the present disclosure, there is provided a method using a processing unit of a stator bar for a generator, the method including: mounting a plurality of stator bars in a mounting part provided on a setup table in a horizontal state; swing the stator bars after the mounting in the mounting part so as not to interfere with surrounding structures; tilting the setup table toward a pit and maintaining the setup table to be in a horizontal state; rotating the setup table in the horizontal state to be vertical in the pit in a state in which the setup table is positioned in the pit to perform welding operation on one end among the welding operation on one end of the stator bar and welding operation on the other end of the stator bar; sliding the rotated setup table toward a lower portion of the pit; moving a workstation including a welding part toward the lowered setup table and performing welding on one end of the stator bar; moving the workstation away from the pit and rotating the setup table to be vertical in the pit to perform welding on the other end of the stator bar; sliding the rotated setup table downward in the pit; moving the workstation including the welding part toward the lowered setup table and performing welding on the other end of the stator bar; moving the workstation away from the pit and rotating the setup table to be horizontal in the pit after the welding operation on both ends of the stator bar ends; and tilting the setup table back to an initial position.

The mounting of the stator bar in the mounting part provided on the setup table may include adjusting the stator bars to be positioned at the same positions in a length direction, respectively before positions of the plurality of stator bars are finally fixed.

In the swing of the stator bars, all of the stator bars may be swung toward one side direction at the same angle.

In the swing of the stator bars, the stator bars may be swung at any angle within an angle range of 180 degrees corresponding to the third quadrant and the fourth quadrant when viewing the setup table from the front based on a quadrant.

In the tilting of the setup table toward the pit and the maintaining of the setup table to be in the horizontal state, the setup table may be tilted toward the pit at 90 degrees.

The rotating of the setup table in the horizontal state to be vertical in the pit may include locking the setup table so as not to be rotated any more after the setup table is rotated to be vertical.

The performing of the welding on one end of the stator bar may include displaying a moving distance of the workstation to the stator bar; providing image information to a worker during the workstation moves toward the stator bar, and during the stator bar is welded; and simultaneously performing welding on all of the plurality of stator bars.

BRIEF DESCRIPTION OF THE DRAWINGS

The above and other objects, features and other advantages of the present disclosure will be more clearly understood from the following detailed description taken in conjunction with the accompanying drawings, in which:

FIG. 8A is a side view diagram illustrating an operation of the processing unit of a stator bar for a generator according to an embodiment of the present disclosure.

FIG. 8B is a front view diagram illustrating an operation of the processing unit of a stator bar for a generator according to an embodiment of the present disclosure.

FIG. 10A is a side view diagram illustrating an operation of the processing unit of a stator bar for a generator according to an embodiment of the present disclosure.

FIG. 10B is a front view diagram illustrating an operation of the processing unit of a stator bar for a generator according to an embodiment of the present disclosure.

FIG. 11A is a side view diagram illustrating an operation of the processing unit of a stator bar for a generator according to an embodiment of the present disclosure.

FIG. 11B is a front view diagram illustrating an operation of the processing unit of a stator bar for a generator according to an embodiment of the present disclosure.

DETAILED DESCRIPTION

A configuration of a processing unit of a stator bar for a generator according to an embodiment of the present disclosure will be described with reference to the accompanying drawings. For reference, FIG. 1 are front and side view diagrams illustrating a processing unit of a stator bar for a generator according to an embodiment of the present disclosure, FIG. 2 is a diagram illustrating a configuration of a setup table and a tiling part according to an embodiment of the present disclosure, and FIG. 3 is a diagram illustrating a state in which a stator bar is swung in the processing unit of a stator bar for a generator according to an embodiment of the present disclosure.

Figure 1A:
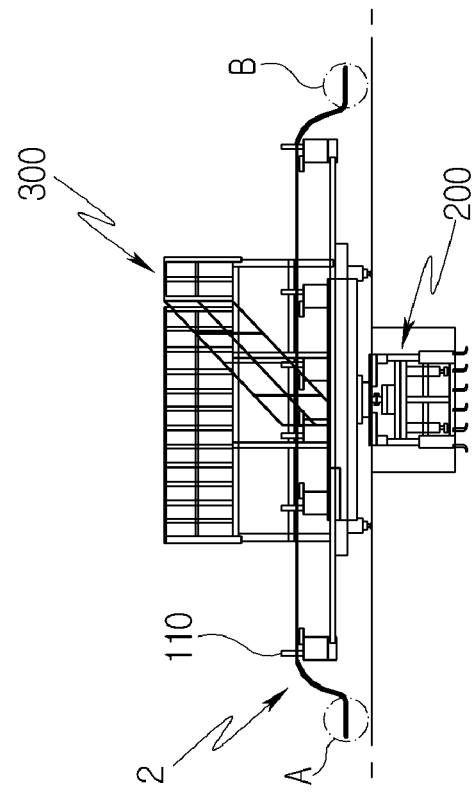
FIG. 1A is a side view diagram illustrating a processing unit of a stator bar for a generator according to an embodiment of the present disclosure.
Figure 1B:
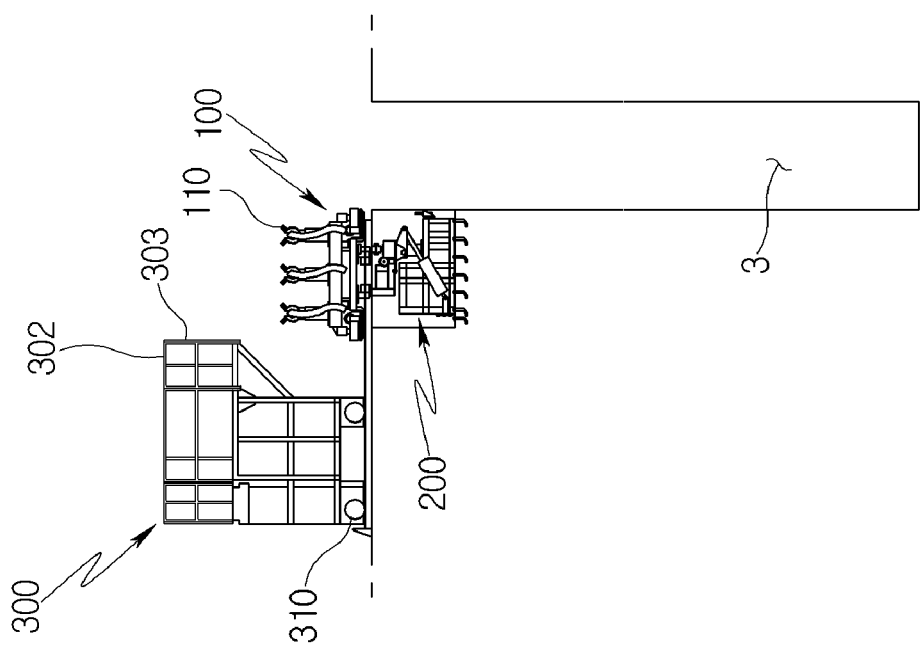
FIG. 1B is a front view diagram illustrating a processing unit of a stator bar for a generator according to an embodiment of the present disclosure.
Figure 2:
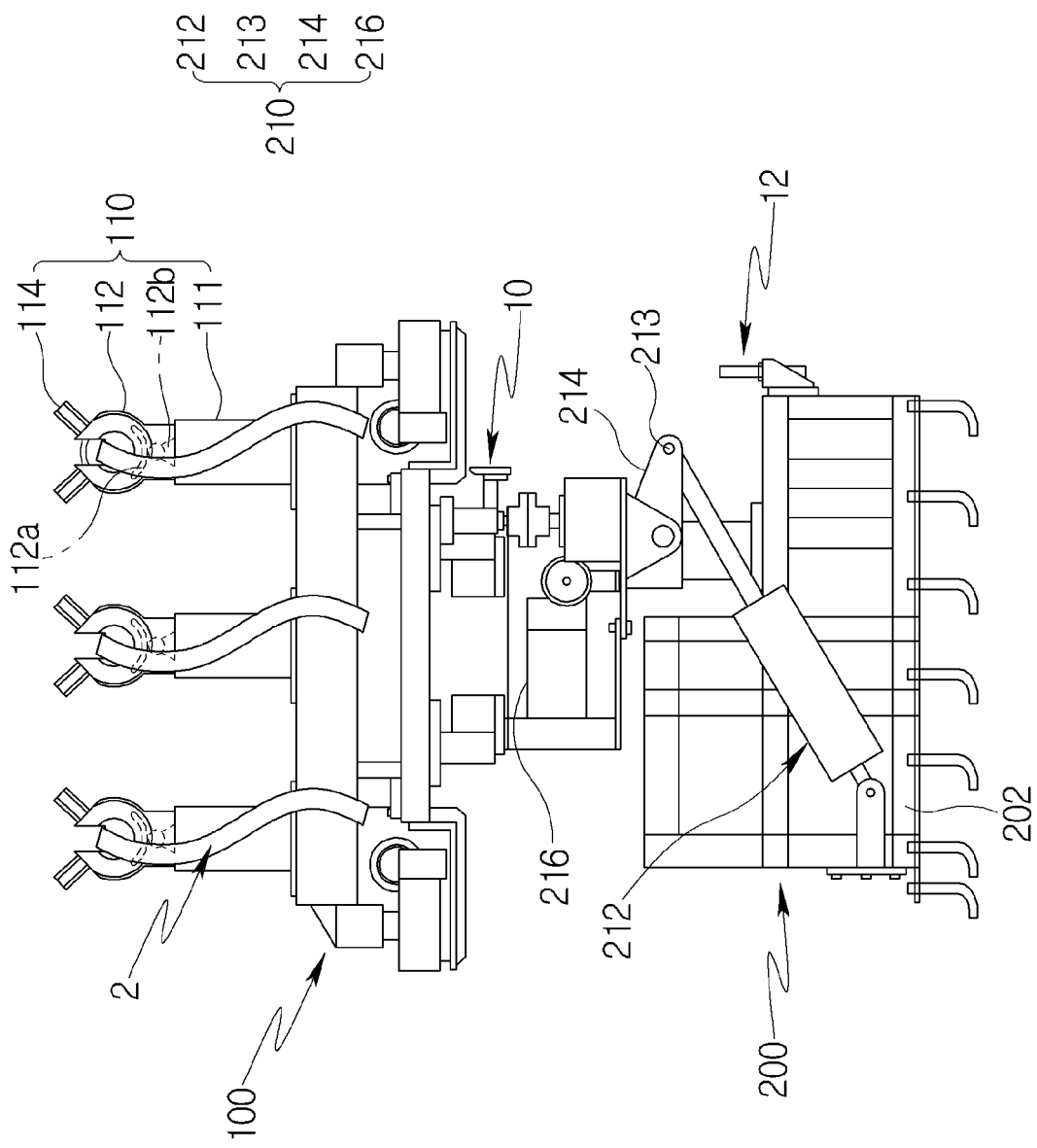
FIG. 2 is a diagram illustrating a setup table and a tiling part according to an embodiment of the present disclosure.
Figure 3:
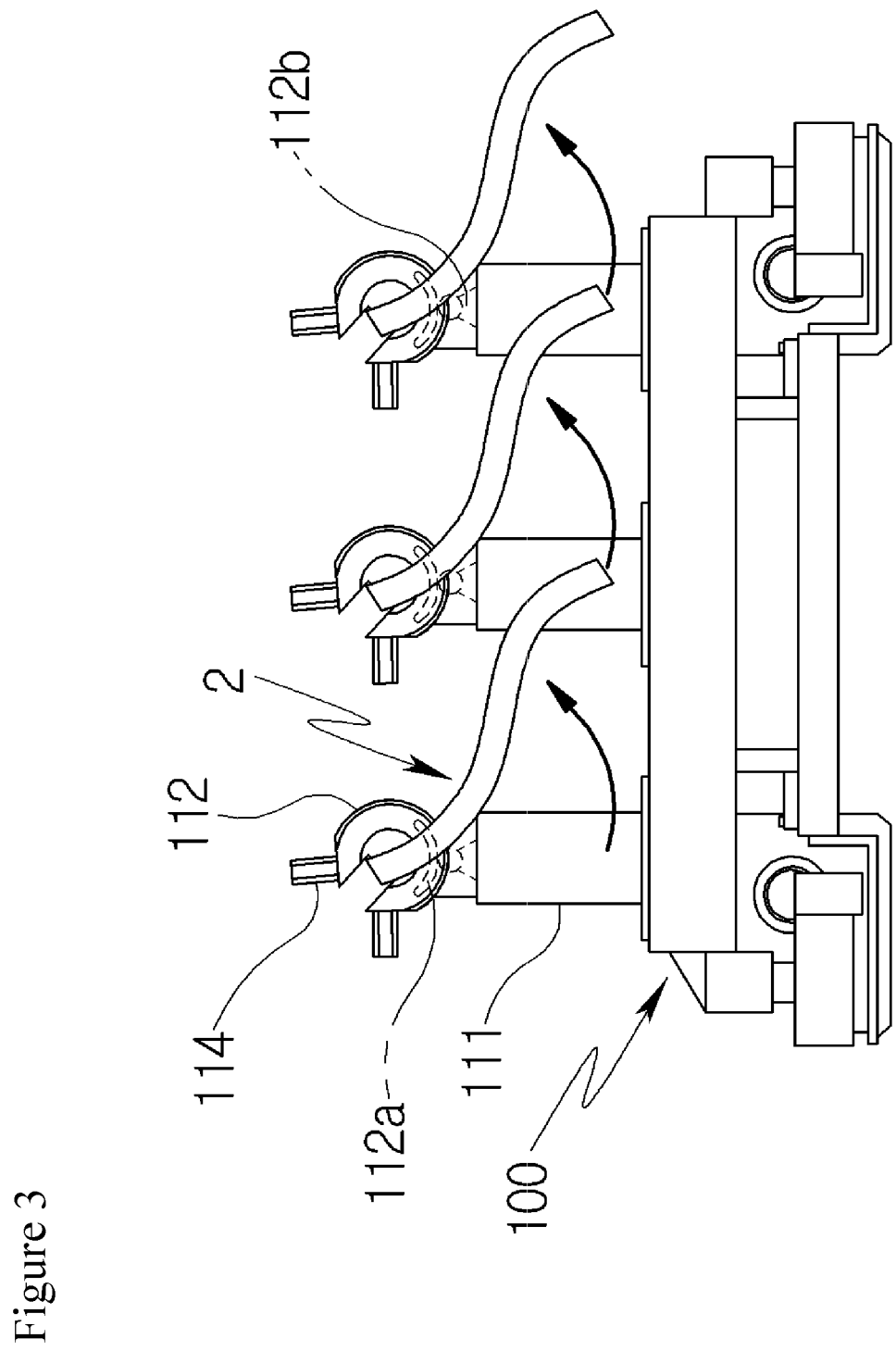
FIG. 3 is a diagram illustrating a state in which a stator bar is swung in the processing unit of a stator bar for a generator according to an embodiment of the present disclosure.

Referring to FIGS. 1 to 3, a processing unit of a stator bar for a generator according to an embodiment of the present disclosure is provided to more easily perform welding on a plurality of stator bars 2. In particular, both ends of the stator bar may be easily welded through stable swing of the plurality of stator bars and tiling thereof toward a pit To this end, a processing unit of a stator bar for a generator according to the present disclosure includes a setup table 100 on which a plurality of stator bars 2 are mounted, a tilting part 200 positioned beneath a mounting part 110, a workstation 300 positioned to face the tilting part 200 and on which a worker rides, a rotating part 400 for rotating the setup table 100 (see FIG. 12), and a sliding part 500 (see FIG. 12).

The workstation 300 moves toward or away from a pit 3 in a state in which the worker rides thereon, and moves to a specific position according to a situation of welding of the stator bar 2 or an overall operation. Further, a worktable 302 is positioned in the workstation 300 so that the worker may ride thereon, and a welding part 303 for performing welding on the stator bar 2 is provided at a front surface of the worktable 302.

Since the stator bar 2 extends at a length of no more than 10 meters, it may be difficult for the worker to manually mount the stator bar 2 on the setup table 100. Therefore, the stator bar 2 is mounted in the mounting part 110 provided on the setup table 100 using heavy equipment such as a crane.

The setup table 100 according to the present embodiment includes a plurality of mounting parts 110 disposed in a lattice form and on which the stator bar 2 to be installed in the generator is fixed to weld both ends of the stator bar 2.

Three stator bars 2 are mounted in the mounting part 110, thus the worker may more rapidly perform welding on the stator bars 2. For reference, the number of components is limited and illustrated for understating the description but may be increased or decreased.

A left end A and a right end B of the stator bar 2 based on an axial direction are welded, respectively. In this case, one stator bar 2 has two welding points including the left end and the right end, and three stator bars 2 have six welding points.

According to the present embodiment, after three stator bars 2 are mounted in the mounting part 110, the left ends A of the three stator bars 2 may be welded at once, and the right ends B of the three stator bars 2 may also be easily welded at once, thereby improving workability of the worker.

The plurality of mounting parts 110 are provided on an upper surface of the setup table 100. The mounting part 110 includes a seating part 112 provided on an extension bar 111 that is extended from an upper portion of the setup table 100 when viewed from the front, and opened upwardly so that the stator bar 2 is inserted, and first cylinder parts 114 installed to face each other at the seating part 112 and moving toward or away from the stator bar 2 positioned in the seating part 112.

The mounting part 110 is disposed in plural along an axial direction of the stator bar 2. According to the present embodiment, two mounting parts 110 are positioned at the vicinity of the left end and at the vicinity of the right end of one stator bar 2, respectively, and four mounting parts 110 are disposed at the center of the stator bar 2 while having a predetermined interval, thus a total of six mounting parts 110 are provided for one stator bar 2. Therefore, the stator bar 2 may be stably fixed, and even when the stator bar 2 is tilted or rotated, the stator bar 2 is not separated from the mounting part 110.

The seating part 112 is formed as a plate having a "U"-letter shape when viewed from the front, and the first cylinder parts 114 are installed at an 11 o'clock direction and an 1 o'clock direction in the drawing, respectively. The seating part 112 includes a rotating shaft (not illustrated) to rotate based on the center when viewed from the front, for swing the stator bar 2.

A reason that the first cylinder parts 114 are installed at the above described directions is because the directions correspond to positions where the stator bar 2 moves downward from a 12 o'clock direction using a crane and may be easily inserted.

As the first cylinder part 114, for example, an air cylinder including a piston is used, but other types of cylinder may be used. Since the piston may move toward or away from the seating part 112, such that the stator bar 2 may be easily fixed or released.

For reference, when the stator bar 2 is first inserted into the seating part 112, an end of the stator bar 2 is positioned at a 6 o'clock direction. The 6 o'clock direction corresponds to a position facing the ground, thus even when the worker conducts an inspection or moves therearound, it is possible to prevent a safety accident caused by collision or contact with the end of the stator bar 2 from occurring.

When the piston moves forward, the stator bar 2 is fixed at a total of six portions thereof including two portions of the left end and the right end and four portions of the center, thus is not separated even when being swung or tilted but maintains a stably fixed state.

A front end of the piston is provided with rubber having elasticity so as not to deform a surface of the stator bar 2 due to direct contact with the stator bar 2, thereby improving fixation force.

Further, while the stator bar 2 is fixed and maintained until the stator bar 2 is welded, it is possible to reduce or prevent an outer circumferential surface of the stator bar 2 contacting the rubber from being deformed and maintain a normal state.

The seating part 112 includes a tooth part 112a and a first motor part 112b, in which the tooth part 112a is formed on the extension bar 111 in a semi-circular shape at the lower rear portion of the seating part 112 to be rotated in a clockwise direction or in a counterclockwise direction in a state in which the stator bar 2 is mounted, and the first motor part 112b is provided to supply a rotation force to the tooth part 112a.

The tooth part 112a is provided for the swing of the stator bar 2 that is seated in the seating part 112, and has the semi-circular shape since the seating part 112 is swung within a predetermined angle.

As the first motor part 112b, a step motor may be used, and the first motor part 112b rotates within a specific angle range, such that the seating part 112 is swung for the swing of the stator bar 2.

A plurality of first motor parts 112b may simultaneously rotate at the same rotation angle, thus when the stator bar 2 is fixed or swung, all of the plurality of stator bars 2 may be swung at the same angle.

Referring to FIGS. 2 to 5, the tilting part 200 according to an embodiment of the present disclosure is provided to tilt the setup table 100 toward the pit 3 at a specific angle by a base frame 202 connected to a lower portion of the setup table 100 and a first driving part 210 positioned above the base frame 202. A driving part may be provided by or include, for example, an actuator.

For reference, the pit 3 may be formed toward the ground to provide a space required for the rotation of the stator bar 2.

The tilting part 200 maintains the whole setup table 100 to be horizontal before tilting, and when the setup table 100 is tilted toward the pit 3, the tilting part 200 tilts the setup table 3 toward the pit 3 at an angle of 90 degrees.

Here, tilting the setup table 100 at the angle of 90 degrees is to stably rotate or slide the setup table 100 mounted with the plurality of stator bars 2 in the pit 3 using an opened area of the pit 3, while not rotating or sliding the setup table 100 on the ground on which workers or facilities are positioned.

For example, when the stator bar 2 is tilted or rotated outside the pit 3, an accident due to collision with facilities, structures, or workers located therearound may occur, thus it may be safe to be rotated in the pit 3.

Further, it is to protect the workers or facilities from a safety accident that may occur just in case, due to the stator bar 2.

The pit 3 has a depth and a width at which the stator bar 2 does not directly interfere with an inner side of the pit 3 even when the setup table 100 is tilted and positioned inside the pit 3. That is, the pit 3 provides a space that enables the rotation or the sliding for stably welding the stator bar 2 mounted in the mounting part 110 of the setup table 100, and in this case, the pit 3 corresponds to a configuration providing an independent space so that the stator bar 2 does not directly contact the workers or the facilities.

The first driving part 210 includes a second cylinder part 212 having one end positioned on an upper surface of the base frame 202 and the other end extending toward a lower surface of the setup table 100, a first arm 214 connected to an upper end of the second cylinder part 212 and rotating within a specific angle range through a hinge part 213, and a link member 216 transferring a rotation force of the second cylinder part 212 to the setup table 100.

The setup table 100 is tilted toward the pit 3 in a horizontal state to be rotated or slid in the pit 3. Here, the tilting means that the setup table 100 is rotated at a specific angle.

The hinge part 213 is connected to an end of the piston, thus the second cylinder part 212 may rotate the first arm 214 in a machine direction or in the counterclockwise direction depending on the forward or backward movement of the piston.

Further, the link member 216 is provided on the first arm 214, and may interwork with the rotation of the first arm 214 to tilt the whole setup table 100 as illustrated in the drawing.

For example, in the tilting part 210, when the piston included in the second cylinder part 212 moves forward or backward, the first arm 214 is pulled to the second cylinder part 212 position, and the whole setup table 100 is tilted by the link member 216 in a right direction based on the drawing.

In order to dampen shock due to the tilting of the setup table 100, the processing unit of a stator bar for a generator according to the present disclosure may include a first stopper 10 positioned beneath (in FIG. 2) the setup table 100, and a second stopper 12 positioned at a side surface of the tilting part 200 while being spaced apart from the second cylinder part 212, and maintained to be in contact with the first stopper 10 when the setup table 100 is tilted.

Figure 4:
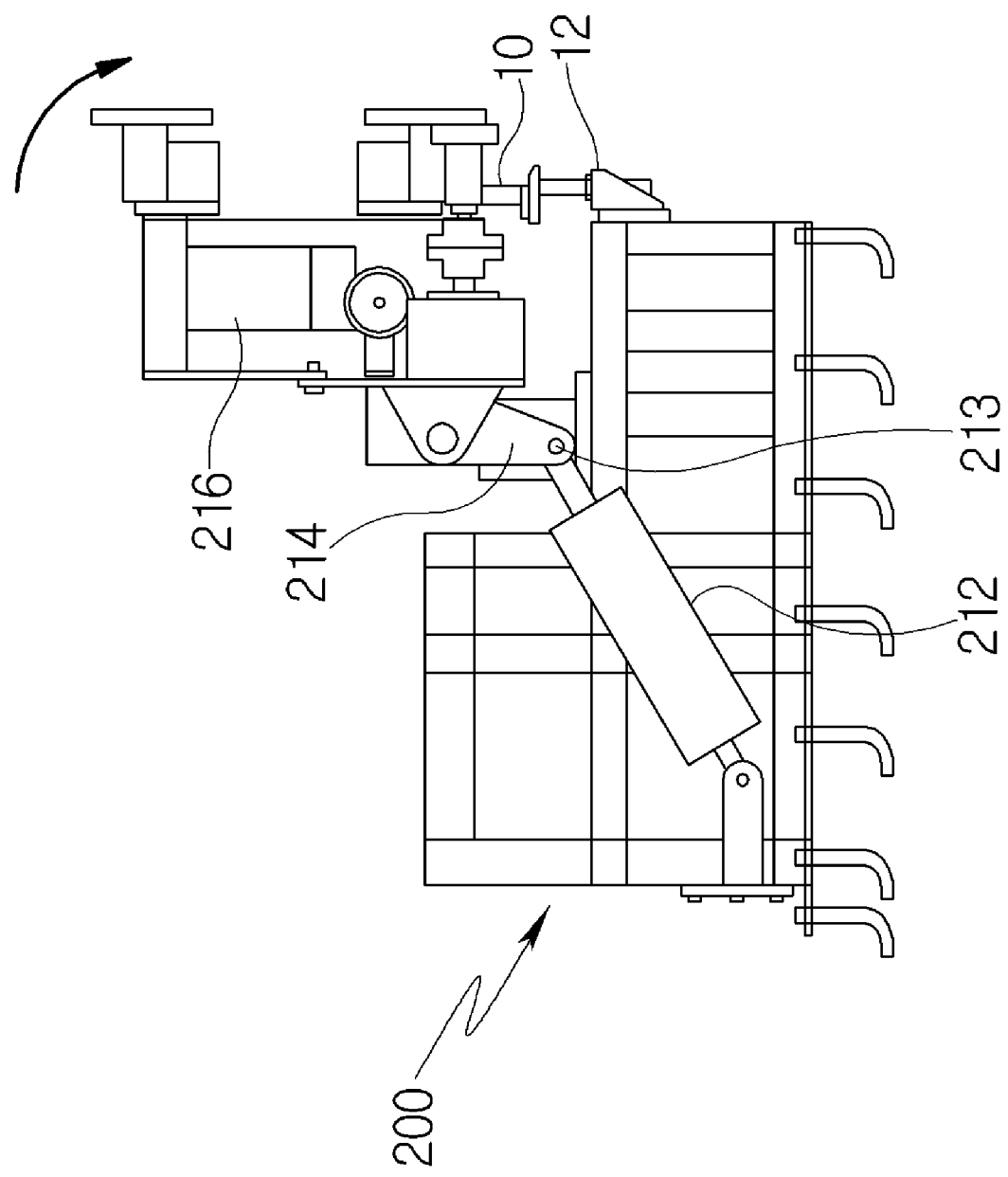
FIG. 4 is a diagram illustrating a state in which the processing unit of a stator bar for a generator according to an embodiment of the present disclosure is tilted.

As illustrated in FIG. 4, when the setup table 100 rotates in an arrow direction for the operation on the stator bar 2, the second stopper 12 contacts the first stopper 10, such that the rotation position of the setup table 100 is maintained at an intended position.

In order to reduce or minimize the shock generated by the tilting of the setup table 100 due to its own weight of the setup table 100 and an added weight resulting from the mounting of the stator bar 2, the first and second stoppers 10 and 12 are provided.

The second stopper 12 is configured as a component capable of damping on an upper end of an extended bar extending upwardly through a bracket at one side surface of the base frame 202 for damping, for example, rubber (not illustrated). Further, a spring may be installed below the rubber to damp a load applied in an axial direction of the second stopper 12. In this case, when the load is applied to the rubber, the load is dispersed by the rubber and the spring, thereby damping the shock caused by direct contact between the first and second stoppers 10 and 12.

The workstation 300 is provided for a space on which the worker may ride and the welding operation on the stator bar 2, and may move toward the stator bar 2.

The workstation 300 is positioned to face the setup table 100 before tilting, and includes a second driving part 310 for moving the workstation toward the setup table 100 and the welding part 303 positioned at the front surface of the worktable 302 that is positioned on the setup table 100 and performing welding on the stator bar.

The second driving part 310 is provided for moving the workstation 300, and may be configured as a general combination of a motor and a gear, or any one of a gasoline engine and a diesel engine. Further, the second driving part 310 transfers a rotation force to a plurality of wheels that are provided at a lower side of the workstation 300, thereby allowing the workstation 300 to move toward or away from the setup table 100.

The worktable 302 provides a space for a worker to perform welding on the stator bar 2, and includes a steering wheel for moving the workstation 300 and a plurality of buttons or a lever for controlling the welding part 303.

The welding part 303 is positioned at the front surface for performing brazing on the stator bar 2, and when the stator bar 2 faces the welding part 303, the workstation 300 moves toward the stator bar 2 to perform welding.

As the welding part 303, an automatic welding machine may be used, and since the welding operation itself is not the focus of the present disclosure, it is briefly described.

The rotating part 400 (see FIG. 9) is provided between the setup table 100 and the tilting part 200 (see FIG. 2, FIG. 9) to rotate the setup table 10 at a first angle in the pit 3. The rotating part 400 may include a motor and a reduction gear.

The sliding part 500 is provided below the setup table 100 to slide the setup table 100 in a longitudinal direction of the pit 3.

The sliding part 500 includes a rack gear, a motor, and a gear unit, and lifts or lowers the setup table to adjust the welding position of the stator bar 2.

A method using a processing unit of a stator bar for a generator according to an embodiment of the present invention will be described with reference to the accompanying drawings.

Figure 6:
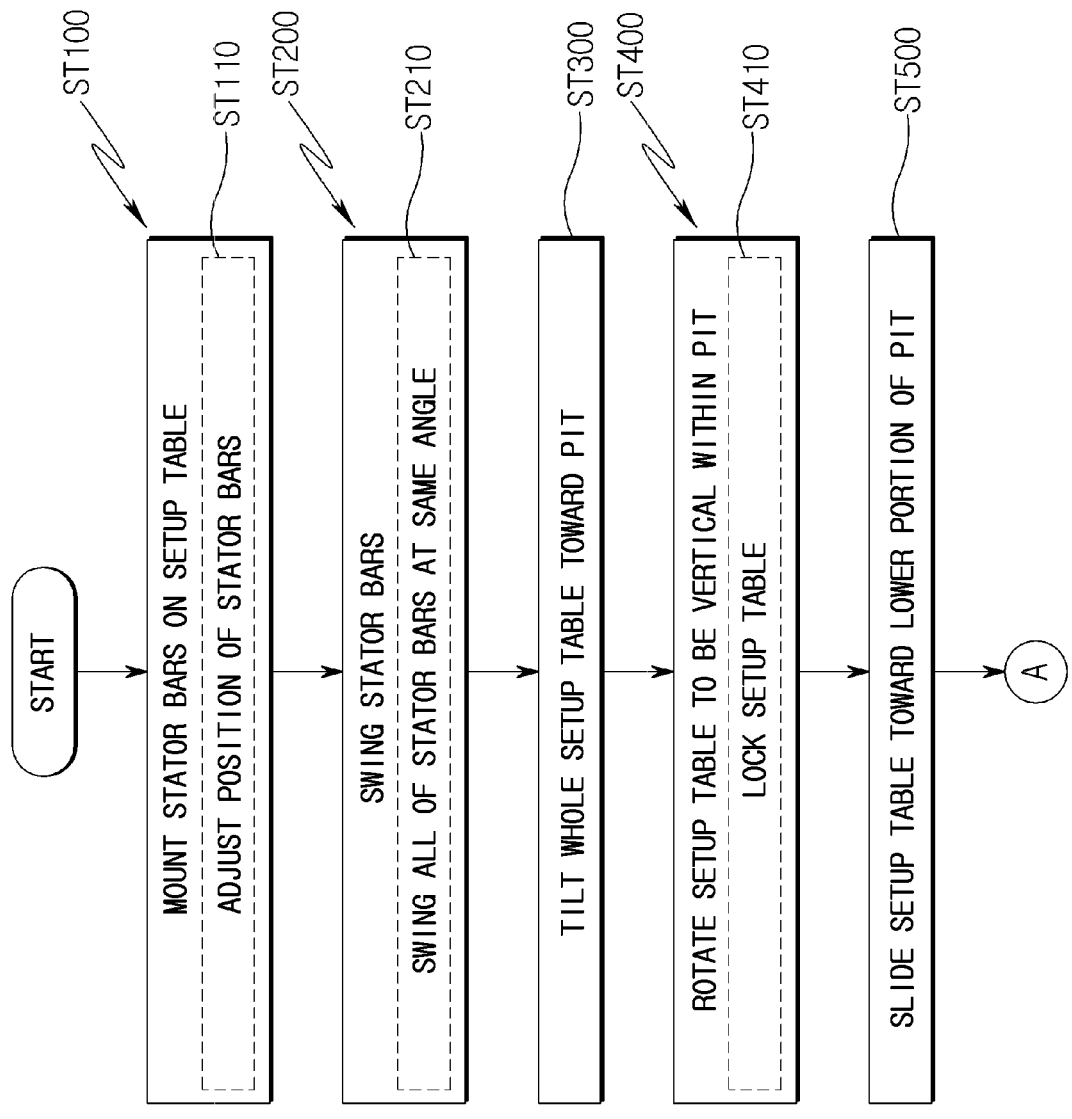
FIG. 6 is a flowchart illustrating a welding method using a processing unit of a stator bar for a generator according to an embodiment of the present disclosure.
Figure 7:
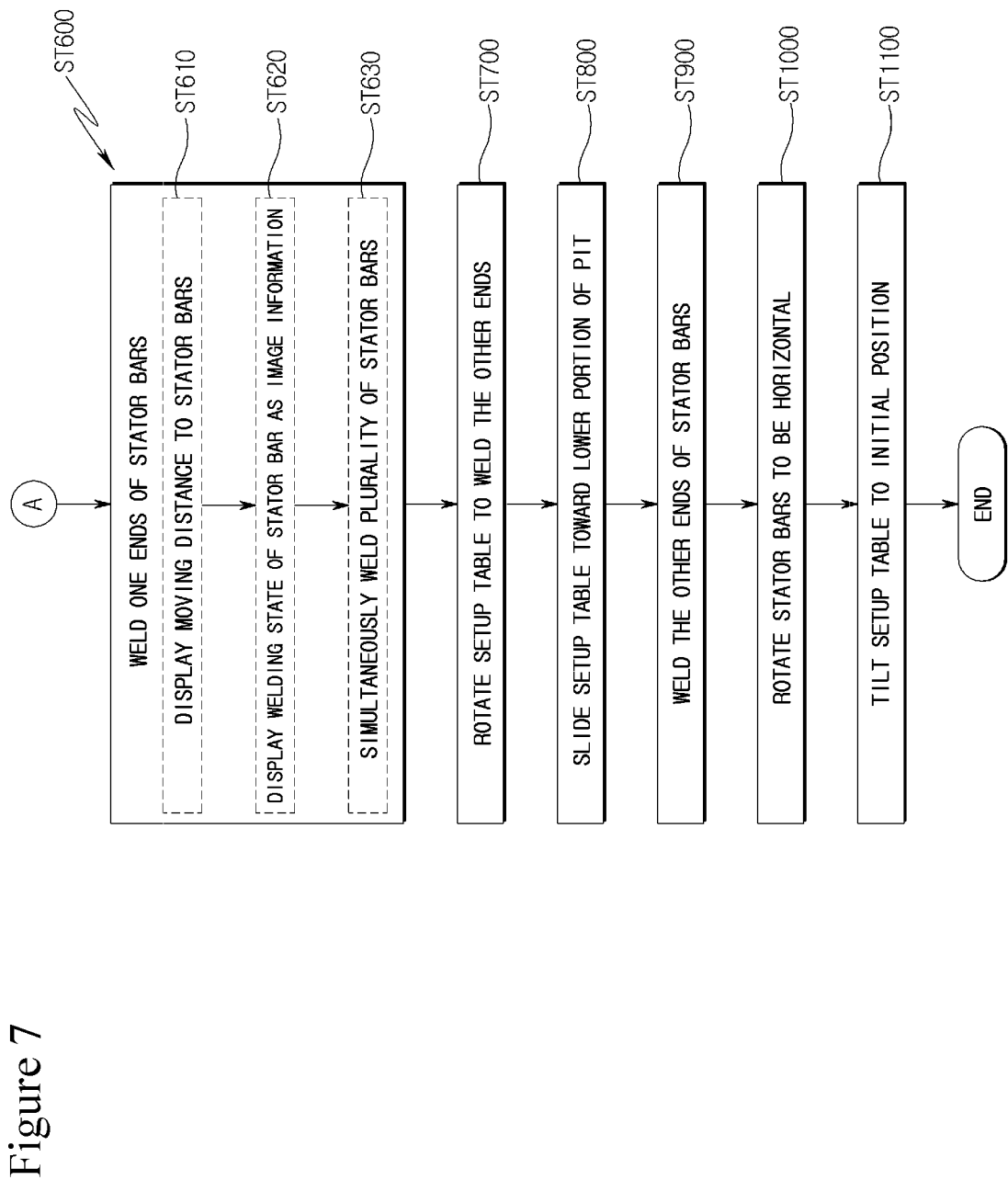
FIG. 7 is a flowchart illustrating a welding method using a processing unit of a stator bar for a generator according to an embodiment of the present disclosure.

Referring to FIGS. 6 and 7, A method using a processing unit of a stator bar for a generator according to the present embodiment includes mounting a plurality of stator bars in the mounting part provided on the setup table in a horizontal state (ST100), swinging the stator bars after the mounting in the mounting part so as not to interfere with surrounding structures (ST200), tilting the setup table toward the pit and maintaining the setup table to be in a horizontal state (ST300), rotating the setup table in the horizontal state to be vertical in the pit in a state in which the setup table is positioned in the pit to perform welding operation on one end among the welding operation on one end of the stator bar and welding operation on the other end of the stator bar (ST 400), sliding the rotated setup table toward a lower portion of the pit (ST500), moving the workstation including a welding part toward the lowered setup table and performing welding on one end of the stator bar (ST600), moving the workstation away from the pit and rotating the setup table to be vertical in the pit to perform welding on the other end of the stator bar (ST 700), sliding the rotated setup table downward in the pit (ST800), moving the workstation including the welding part toward the lowered setup table and performing welding on the other end of the stator bar (ST900), moving the workstation away from the pit and rotating the setup table to be horizontal in the pit after the welding on both ends of the stator bar ends (ST1000), and tilting the setup table back to an initial position (ST1100).

The mounting of the stator bar in the mounting part provided on the setup table (ST100) includes adjusting the stator bars to be positioned at the same positions in a length direction, respectively before positions of the plurality of stator bars are finally fixed (ST110).

The stator bar may be mounted in the mounting part through a crane, thus a plurality of stator bars may not be precisely positioned at the same positions, but be positioned at different positions in the length direction. In this case, when the positions of the respective stator bars are adjusted to be uniform in the length direction, it is possible to reduce or prevent a safety accident caused by direct contact with the workers or surrounding facilities from occurring in advance.

Accordingly, it is possible to reduce or prevent occurrence of a safety accident or damage caused by the swing of the stator bar.

Figure 5:
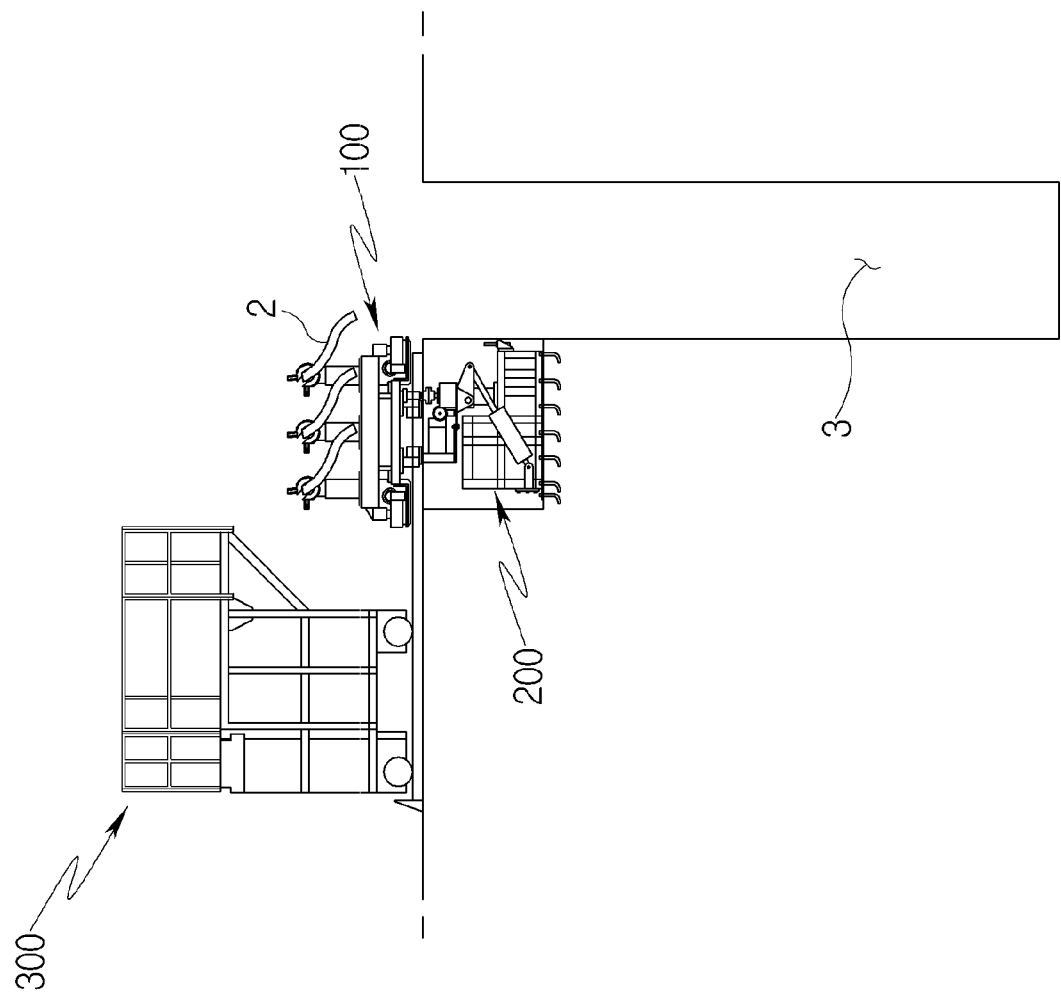
FIG. 5 is a diagram illustrating an operation of the processing unit of a stator bar for a generator according to an embodiment of the present disclosure.

Referring to FIG. 5, when the stator bars are swung (ST200), all of the stator bars are swung toward one side direction at the same angle (ST210). In this case, there is no need to additionally swing the stator bar when performing welding, thus it possible to simultaneously improve workability and working speed of the worker.

When the stator bars are swung (ST200), the position according to an angle at which the stator bars are swung is within an angle range of 180 degrees when calculating an angle corresponding to the third quadrant and the fourth quadrant when viewing the setup table from the front based on a quadrant. Further, the stator bar is swung at any angle within the angle range of 180 degrees. As an example, in the present embodiment, the stator bar may be swung in a 45 degrees direction of the third quadrant or the fourth quadrant.

Referring to FIG. 8, after the setup table is tilted, the horizontal state is maintained. However, in order to easily perform welding, one end of the stator bar needs to be positioned to face the workstation. In order to maintain the horizontal state after the setup table is tilted toward the pit (ST300), the stator bar is tilted toward the pit at 90 degrees. The angle corresponds to an angle at which the setup table may easily rotate to be vertical toward the pit.

Figure 9A:
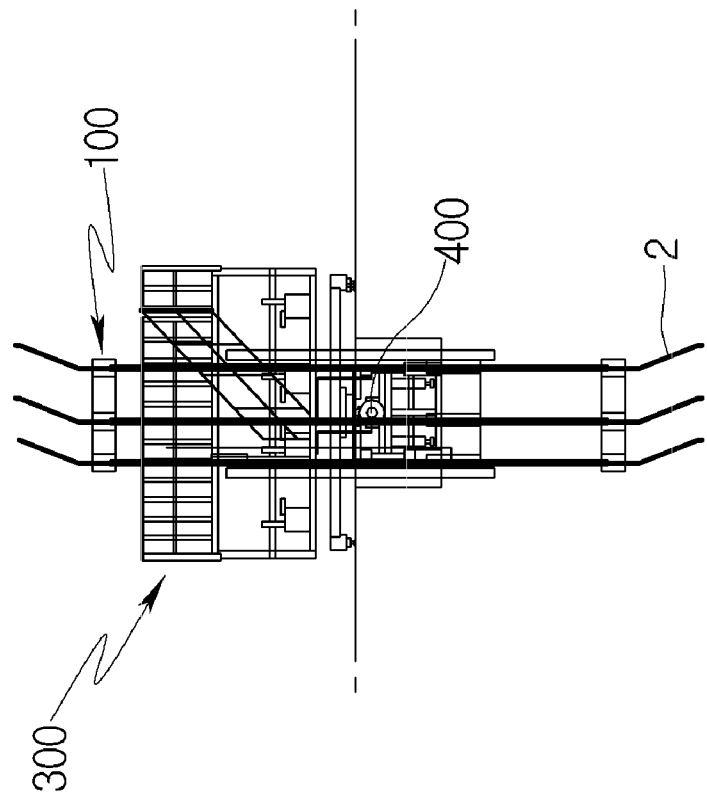
FIG. 9A is a side view diagram illustrating an operation of the processing unit of a stator bar for a generator according to an embodiment of the present disclosure.
Figure 9B:
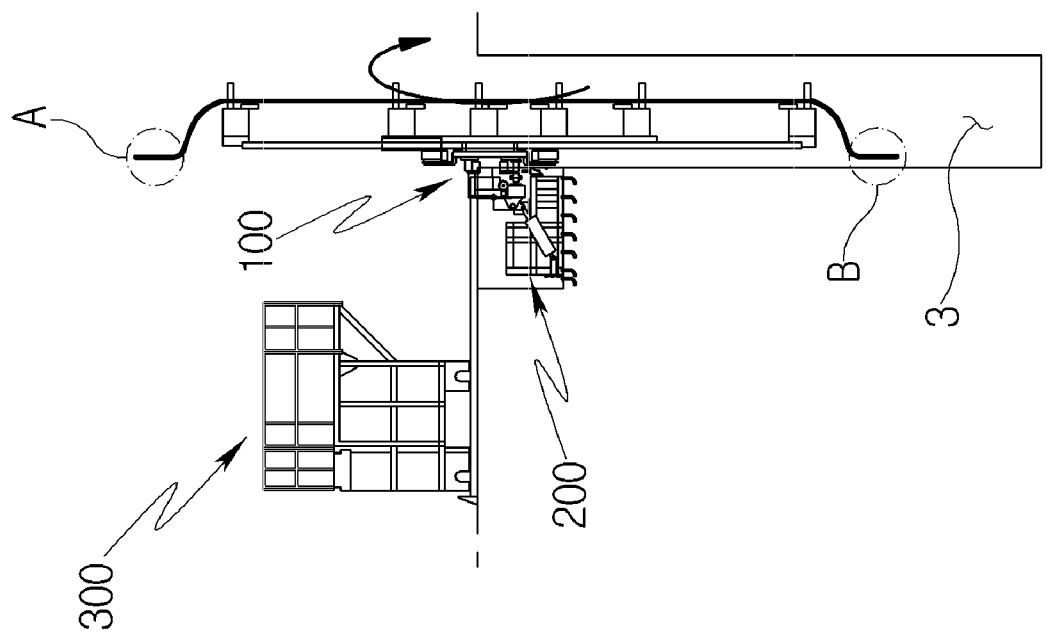
FIG. 9B is a front view diagram illustrating an operation of the processing unit of a stator bar for a generator according to an embodiment of the present disclosure.

Referring to FIG. 9, the setup table is rotated to be vertical in the pit (ST400), in this case, one end or the other end of the stator bar to be welded is positioned above the pit.

After being rotated to be vertical (ST400), the setup table is locked so as not to be rotated any more (ST410). Accordingly, a phenomenon that the setup table that is heavy falls down to the lower side of the pit does not occur. As a result, the welding operation may be stably performed on the stator bar.

Referring to FIG. 10, in the sliding of the setup table (ST500), the setup table is lowered to the lower side of the pit so that one end A or the other end B of the stator bar to be welded is positioned to face the workstation. Here, as to the welding sequence, one end A is first welded, and then the other end B is welded.

In this case, since the welding operation on one end A or the other end B of the stator bar may be performed merely by moving the workstation forward, workability of the worker is improved (ST600).

Referring to FIG. 11, in the performing of the welding on one end A of the stator bar (ST600), a moving distance of the workstation to the stator bar is displayed so that the worker may recognize the distance (S610). The worker may determine an optimal position where the stator bar may be stably welded by the welding part, using his/her naked eyes and the distance information.

Further, in order for the worker to more stably perform the welding operation on the stator bar, image information is provided to the worker while the workstation moves toward the stator bar, and while the stator bar is welded (ST620). The image information allows the worker to easily perform welding even in a case in which the worker does not check the welding situation using his/her naked eyes.

In addition, since all of the plurality of stator bars may be simultaneously welded (ST630), if the position of the welding part and the positions of the stator bars are stably maintained, one end and the other end of the stator bars may be easily welded in a single operation. As a result, workability of workers is improved, and the welding operation may also be safely performed.

Figure 12A:
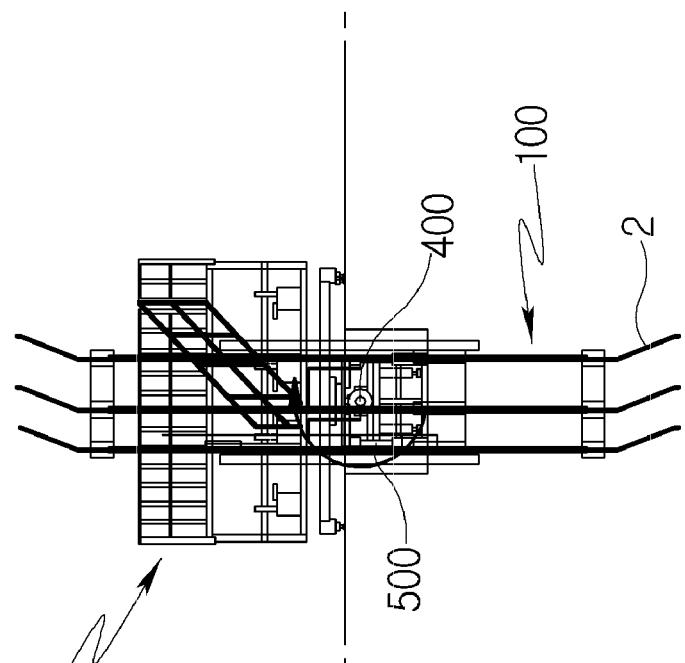
FIG. 12A is a side view diagram illustrating an operation of the processing unit of a stator bar for a generator according to an embodiment of the present disclosure.
Figure 12B:
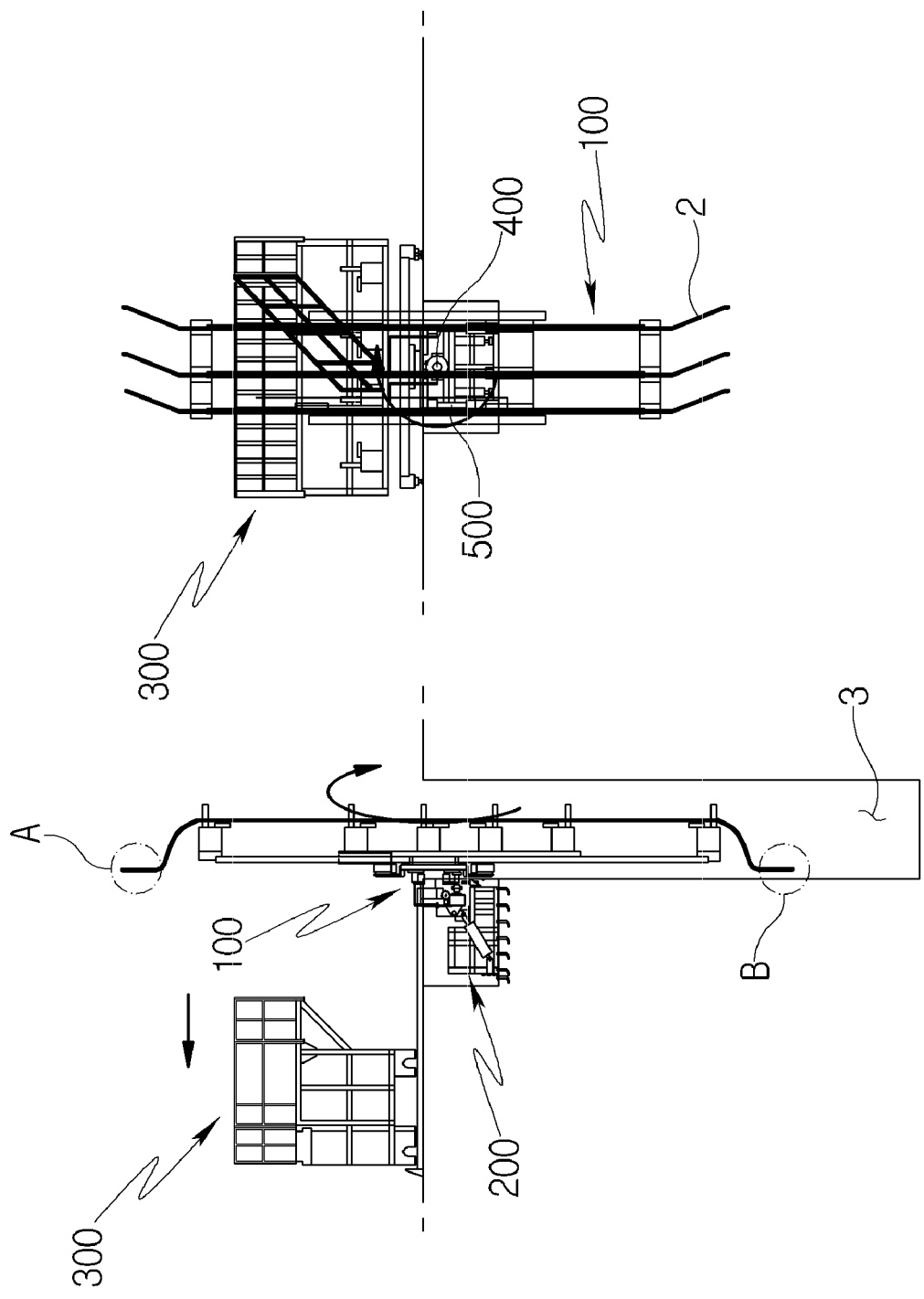
FIG. 12B is a front view diagram illustrating an operation of the processing unit of a stator bar for a generator according to an embodiment of the present disclosure.
Figure 13B:
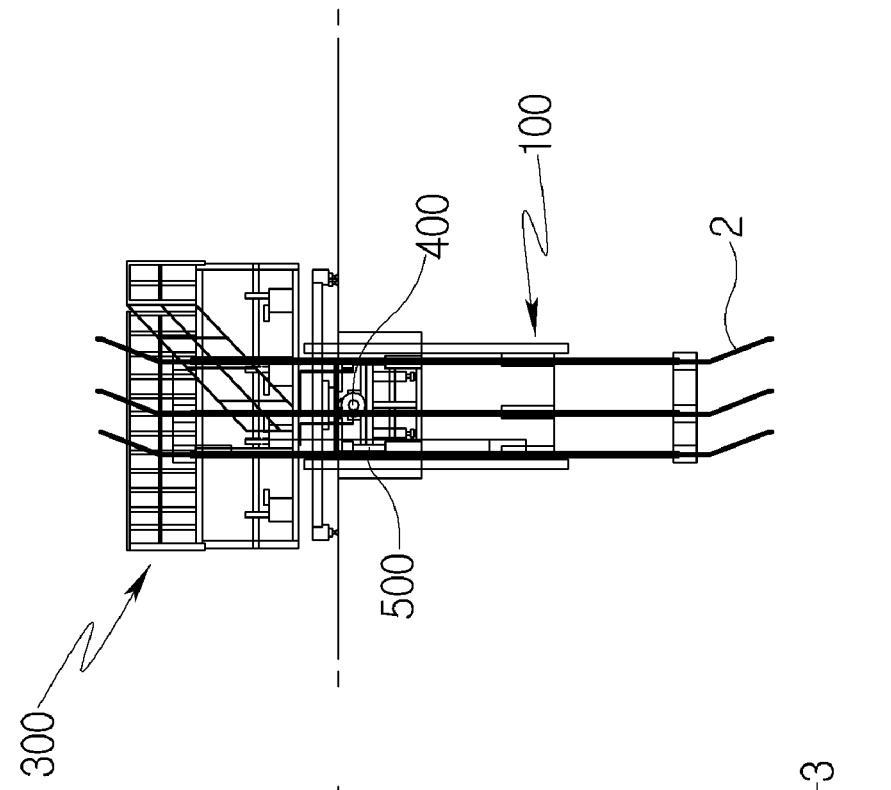
FIG. 13B is a front view diagram illustrating an operation of the processing unit of a stator bar for a generator according to an embodiment of the present disclosure.
Figure 13A:
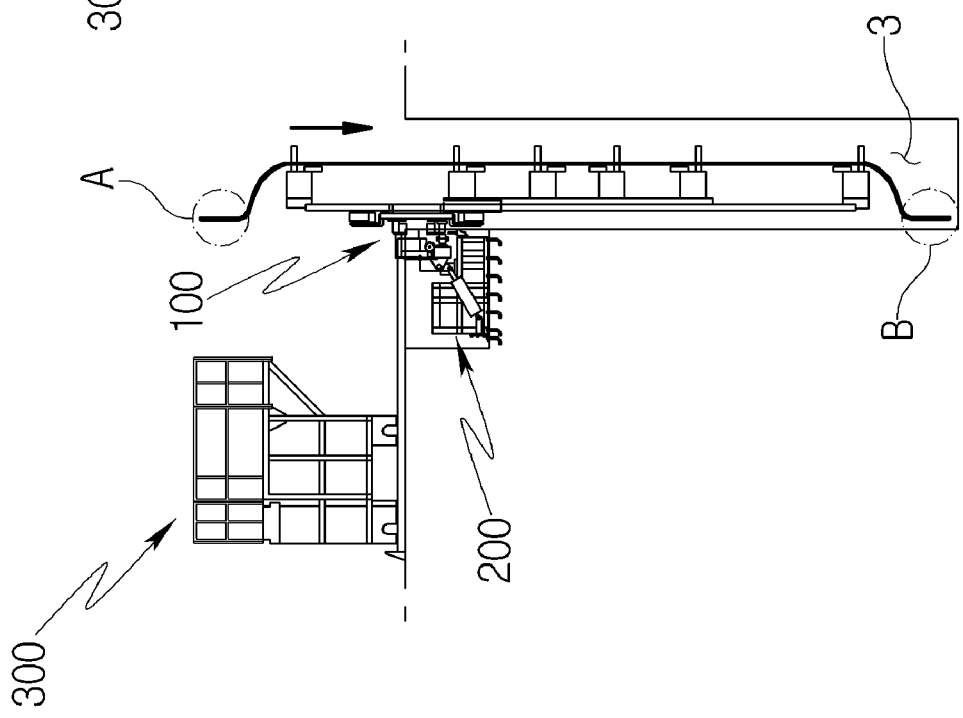
FIG. 13A is a side view diagram illustrating an operation of the processing unit of a stator bar for a generator according to an embodiment of the present disclosure.
Figure 14A:
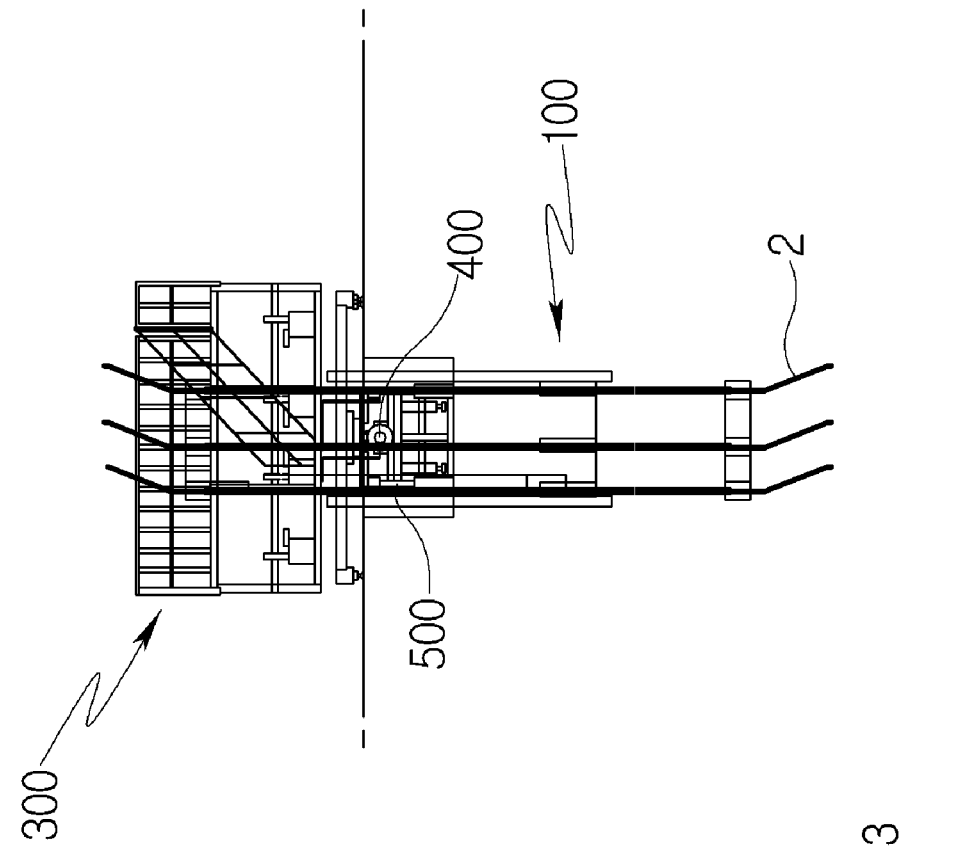
FIG. 14A is a side view diagram illustrating an operation of the processing unit of a stator bar for a generator according to an embodiment of the present disclosure.
Figure 14B:
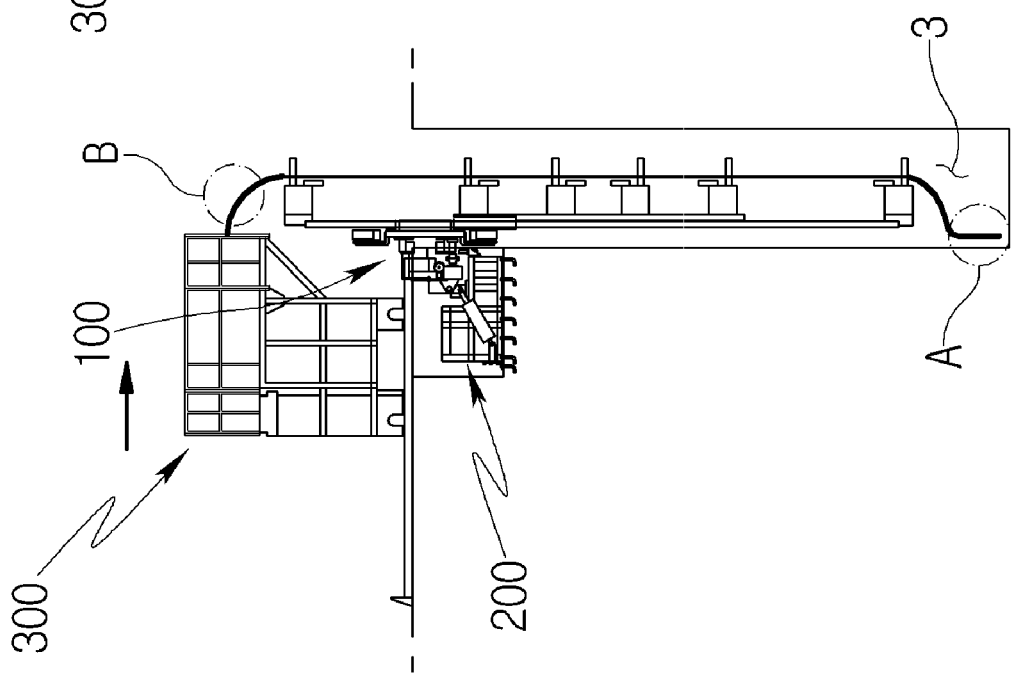
FIG. 14B is a front view diagram illustrating an operation of the processing unit of a stator bar for a generator according to an embodiment of the present disclosure.

Referring to FIGS. 12 to 14, after one end A of the stator bar is welded (ST600), the workstation moves away from the stator bar to weld the other end B, and only the setup table is rotated at 180 degrees in the pit (ST700).

In this case, the other end B of the stator bar is positioned to be higher than the welding part provided at the workstation, thus the setup table is slid to be lowered to the lower side of the pit (ST800). Then, the workstation moves toward the stator bar.

After the welding operation on the one end A and the other end B of the stator bar is completed, the setup table is rotated to be horizontal in the pit (ST1000) and is tilted to the initial position, and then the welding operation on the stator bar ends (ST1100).

According to the embodiments of the present disclosure, when performing welding on the stator bar, the stator bar is mounted on the setup table, and may be swung and be tilted, thereby making it possible to improve workability of a worker and reduce or prevent a safety accident in advance.

According to the embodiments of the present disclosure, a plurality of stator bars may be mounted, and after the stator bars are rotated to be vertical, the workstation approaches, thereby easily performing the welding. The plurality of stator bars may be welded at once, such that the welding workability is improved, and the welding operation may be easily performed on both of the left and right ends of the stator bar.

While the present disclosure has been provided with respect to the specific embodiments, it will be apparent to those skilled in the art that various changes and modifications may be made without departing from the spirit and scope of the following claims.

Moreover, the above advantages and features are provided in described embodiments, but shall not limit the application of the claims to processes and structures accomplishing any or all of the above advantages.

What is claimed is:

1. A processing apparatus for a stator bar of a generator, comprising:
   a setup table including a plurality of mounting parts that fix the stator bar for welding of both ends of the stator bar;
   a tilting part that tilts the setup table toward a pit at a specific angle by a base frame connected to a lower portion of the setup table and a first actuator positioned above the base frame;
   a workstation facing the setup table and including a second actuator that moves the workstation toward the setup table, and a welder positioned at a front surface of a worktable that performs welding on the stator bar;

a rotating part provided between the setup table and the tilting part that rotates the setup table at a first angle in the pit; and a sliding part provided below the setup table to slide the setup table in a longitudinal direction of the pit.

2. The apparatus of claim 1, wherein the plurality of mounting parts are disposed along a length direction of the stator bar.

3. The apparatus of claim 1, wherein each mounting part includes a seat provided on an extension bar that extends from an upper portion of the setup table when viewed from the front and opens upwardly so that the stator bar may be inserted, and first cylinders positioned to face each other at the seat and operable to move toward or away from the stator bar positioned in the seat.

4. The apparatus of claim 3, wherein the seat includes a tooth disposed on the extension bar in a semi-circular shape at a lower rear portion of the seat to rotate in a clockwise direction or in a counterclockwise direction in a state in which the stator bar is mounted, and a first motor that supplies a rotation force to the tooth.

5. The apparatus of claim 4, wherein a plurality of first motors are operable to simultaneously rotate at a same rotation angle.

6. The apparatus of claim 1, wherein the first actuator includes a cylinder having one end positioned on an upper surface of the base frame and an other end extending toward a lower surface of the setup table, a first arm coupled to an upper end of the cylinder that rotates through a hinge, and a link member that transfers a rotation force of the cylinder to the setup table.

7. The apparatus of claim 1, wherein the tilting part maintains the setup table to be horizontal before tilting, and when the setup table is tilted toward the pit, the tilting part tilts the setup table at an angle of 90 degrees.

8. The apparatus of claim 7, further comprising a first stopper positioned at a side surface of the setup table to damp shock due to the tilting of the setup table; and a second stopper positioned at a side surface of the tilting part and operable to contact the first stopper when the setup table is tilted.

* * * * *